United States Patent
Muldowney et al.

(10) Patent No.: US 8,873,241 B2
(45) Date of Patent: Oct. 28, 2014

(54) INTRINSICALLY SAFE SERVICEABLE TRANSMITTER APPARATUS AND METHOD

(75) Inventors: Mark L. Muldowney, Chalfont, PA (US); Keith Sayuk, Harleysville, PA (US)

(73) Assignee: Honeywell International Inc., Morristown, NJ (US)

( * ) Notice: Subject to any disclaimer, the term of this patent is extended or adjusted under 35 U.S.C. 154(b) by 212 days.

(21) Appl. No.: 13/275,652

(22) Filed: Oct. 18, 2011

(65) Prior Publication Data

US 2012/0300420 A1 Nov. 29, 2012

Related U.S. Application Data

(60) Provisional application No. 61/488,869, filed on May 23, 2011.

(51) Int. Cl.
*H05K 5/00* (2006.01)
*G01F 15/06* (2006.01)

(52) U.S. Cl.
CPC .................................. *G01F 15/063* (2013.01)
USPC .......................................... 361/752; 361/730

(58) Field of Classification Search
USPC ............... 361/600, 679.01, 679.31, 748, 752, 361/728–730, 796
See application file for complete search history.

(56) References Cited

U.S. PATENT DOCUMENTS

| | | | |
|---|---|---|---|
| 6,574,652 B2 | 6/2003 | Burkhard | |
| 6,795,319 B2 * | 9/2004 | Preston et al. | ................ 361/752 |
| 7,940,508 B2 | 5/2011 | Helfrick et al. | |
| 2002/0007681 A1 | 1/2002 | Fandrey et al. | |
| 2005/0284227 A1 | 12/2005 | Broden et al. | |
| 2007/0161270 A1 | 7/2007 | Insalaco et al. | |
| 2009/0180263 A1 | 7/2009 | Eriksen et al. | |
| 2009/0253388 A1 | 10/2009 | Kielb et al. | |
| 2009/0311975 A1 | 12/2009 | Vanderaa et al. | |

OTHER PUBLICATIONS

Intrinsic safety—Wikipedia, the free encyclopedia, May 19, 2011, 2 pages.
Muldowney, M.L., et al., "Intrinsicly Safe Serviceable Transmitter," Novelty Search Report, Honeywell, H0028049, Feb. 7, 2011, 6 pages.
What does "intrinsically safe mean?" http://www.ruggedpcreview. com/3_definitions_intrinsic.html, printed May 20, 2011, 2 pages.
PCT International Search Report for PCT/US2012/036481 dated Nov. 23, 2012.

* cited by examiner

*Primary Examiner* — Bernard Rojas
(74) *Attorney, Agent, or Firm* — Kermit D. Lopez; Luis M. Ortiz; Ortiz & Lopez, PLLC

(57) ABSTRACT

An intrinsically safe serviceable transmitter apparatus and method includes a sensor module composed of at least a sensor and a sensor electronic module in order to transmit an electrical signal from the sensor module to a dual cap electronic housing module. The dual cap electronic housing module includes an electronics module, a terminal block, and an intrinsically safe circuit and noise rejection unit. The electronic housing module includes a meter cap and a field-wiring cap in order to permit a user to open either side of the transmitter housing in an intrinsically sale environment. Once open, a local integral meter can be added to calibrate and reconfigure the apparatus and/or to replace a communications board. The terminal block located in a field-wiring compartment acts as an intrinsically safe barrier for the rest of the transmitter electronics and simplifies board replacement.

17 Claims, 5 Drawing Sheets

INTRINSICALLY SAFE SERVICEABLE TRANSMITTER APPARATUS AND METHOD

CROSS-REFERENCE TO PROVISIONAL PATENT APPLICATION

This patent application claims the benefit under 35 U.S.C. §119(e) of U.S. Provisional Application Ser. No. 61/488,869 entitled, "Intrinsically Safe Serviceable Transmitter," which was filed on May 23, 2011 and is incorporated herein by reference in its entirety.

TECHNICAL FIELD

Embodiments are generally related to IS (Intrinsically Safe) devices, systems, and methods. Embodiments are also related to transmitter devices and methods. Embodiments are also related to transmitter upgrade techniques. Embodiments are additionally related to an IS serviceable transmitter.

BACKGROUND OF THE INVENTION

Existing transmitters must be taken out of service and powered down before any field upgrades or repairs can be made to avoid violating IS (Intrinsically Safe) operating procedures. This process typically requires special permits, scheduling, and downtime for users.

In general, intrinsic safety (IS) is a protection technique for safe operation of electronic equipment in explosive atmospheres and under irregular operating conditions. The concept was developed for safe operation of process control instrumentation in hazardous areas such as, for example, North Sea gas platforms. As a discipline, it is an application of inherent safety in instrumentation.

The theory behind intrinsic safety is to ensure that the available electrical and thermal energy in the system is always low enough that ignition of the hazardous atmosphere cannot occur. This is achieved by ensuring that only low voltages and currents enter the hazardous area, and that Zener safety barriers protect all electric supply and signal wires. Sometimes an alternative type of barrier known as a galvanic isolation barrier may be used.

In normal uses, electrical equipment often creates internal tiny sparks in switches, motor brushes, connectors, and in other places. Such sparks can ignite flammable substances present in air. A device termed intrinsically safe is designed to not contain any components that produce sparks or which can hold enough energy to produce a spark of sufficient energy to cause an ignition. For example, during marine transfer operations when flammable products are transferred between the marine terminal and tanker ships or barges, two-way radio communication needs to be constantly maintained in case the transfer needs to stop for unforeseen reasons such as a spill. The United States Coast Guard requires that the two-way radio must be certified as intrinsically safe.

Another aspect of intrinsic safety is controlling abnormal small component temperatures. Under certain fault conditions (such as an internal short inside a semiconductor device), the temperature of a component case can rise to a much higher level than in normal use. Safeguards, such as current limiting by resistors and fuses, must be employed to ensure that in no case can a component reach a temperature that could cause auto ignition of a combustible atmosphere.

No single field device or wiring is intrinsically safe by itself (except for battery-operated, self contained devices), but is intrinsically safe only when employed in a properly designed IS system. All systems are provided with detailed instructions with the proper instructions to ensure safe use.

Intrinsic safety is a requirement that may be applicable to devices that are being operated in areas with flammable gases or fuels. It means that the device is incapable of igniting those gases. In short, an intrinsically safe piece of equipment won't ignite flammable gases. ISA-RP12-6, for example, defines intrinsically safe equipment as "equipment and wiring which is incapable of releasing sufficient electrical or thermal energy under normal or abnormal conditions to cause ignition of a specific hazardous atmospheric mixture in its most easily ignited concentration."

Many ultra ruggedized mobile computers will include intrinsically safe (IS) specifications or approval ratings. Understanding IS approval ratings can be a difficult proposition for even the most informed user. Intrinsically safe areas are hazardous environments where flammable gases, vapors, and liquids are stored and manufactured. These areas are prevalent in many of today's manufacturing facilities including chemical plants, paint manufacturers, oil refineries, textile mills, etc.

Each designated hazardous environment has specific certification requirements for all equipment used in the IS area. Intrinsically safe equipment must carry a label, which specifies the exact IS rating for the equipment and the name of the NRTL (Nationally Recognized Testing Laboratory) who tested it. Testing laboratories have very stringent certification requirements that vary according to the level of IS approval desired. Therefore, each intrinsically safe device is certified for different levels of IS approval and can only be used in specific hazardous environments. The bottom line is that close attention must be given to the specific IS approval certification for each individual piece of equipment. Just because a device has an IS rating does not mean that the device can be used in any IS area.

IS approval certifications are made up of multiple classes, groups, and divisions that correspond to the specific hazardous environment a device is approved to operate in. Each class consists of two divisions and certain classes have multiple groups. For example, Class I includes flammable gases, Class II includes flammable dust, and Class III includes flammable fibers. Each class has two divisions. Division 1 includes environments where explosive material is present in the air at all times. Division 2 includes environments where explosive material is stored in sealed containers, and explosive material is only present for short time intervals (when a failure occurs or during maintenance). Also, Classes I and II are broken down into groups that correspond to the explosive properties of each specific material. For example, Group A includes Acetylene and Group E includes aluminum dust. In addition, IS approval ratings differ significantly from country to country. A device that is IS certified for use in the U.S. may not be certified, for example, in Europe.

A transmitter can be coupled to process equipment to assist in detecting and transmitting process variable data such as, for example, data that is indicative of pressure, temperature, flow, etc. In a typical configuration, a transmitter can be located at a remote location and sensed process variables can be transmitted to a receiving device or system such as, for example, a control room in an industrial setting. Various techniques can be employed to transmit process variables including wired and/or wireless communications. Pressure transmitters, for example, are utilized in industrial process control environments to measure the pressure of a fluid (e.g., gas, liquids and their combination) with respect to the particular process. Pressure transmitters can also be employed to assist in the measurement and transmission pressure data such as, for example, differential, absolute or gauge pressures.

Conventional transmitters must be periodically taken out of service and powered down before any field upgrades or repairs can be made, in order to avoid violating intrinsically safe operating procedures. Such an approach requires special permits, scheduling, and downtime. Unfortunately, making improvements and modifications to existing transmitter systems is a highly complex process as improvements and modifications made to, for example, a communication board, may encroach on the other electronics on the same board of the transmitter. Additionally, the transmitter must be turned off before removing the electronics on the same board for repair. Such an approach creates discontinuity in the operation of the transmitter system and also requires special permits, scheduling, and downtime.

Based on the foregoing, it is believed that a need exists for an improved intrinsically safe serviceable transmitter apparatus and method, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved pressure transmitter apparatus and method.

It is another aspect of the disclosed embodiments to provide for an improved transmitter upgrading technique.

It is a further aspect of the disclosed embodiments to provide for an improved intrinsically safe serviceable transmitter apparatus and method.

The aforementioned aspects and other objectives and advantages can now be achieved as described herein. An intrinsically safe serviceable transmitter apparatus and method is disclosed herein. A sensor module includes a sensor and a sensor electronic module in order to transmit an electrical signal from the sensor module to a dual cap electronic housing module. The dual cap electronic housing module includes an electronics module, a terminal block, and an intrinsically safe circuit and noise rejection unit. The electronic housing module includes a meter cap and a field-wiring cap in order to permit a user to open either side of the transmitter housing in an intrinsically safe environment. Once open, a local integral meter can be added to calibrate and reconfigure the apparatus and/or to replace a communications board. The terminal block located in a field-wiring compartment acts as an intrinsically safe barrier for the rest of the transmitter electronics and simplifies board replacement.

The apparatus further includes one or more printed wiring assembly (PWA). The measured values and the sensor parameters from the sensor module can be transferred to the dual cap electronic housing module in order to compute precise primary output linearization. The sensor module further includes a digital-to-analog converter supplied bridge power unit, an input signal conditioner, an analog to digital converter, a three channel multiplexer, and an EEPROM (Electrically Erasable Programmable Read-Only Memory) in order to measure or generate signals that are representative of the process variable to be sensed. The dual cap electronic housing includes a power source, a modem, and an optional local meter. The local integral optional meter can be activated if the sensor module detects a problem in transmitting the signals.

A graphic display with external or internal configuration buttons can be utilized to display the measurement with a choice of units. A connector or appropriate connecting component can mechanically couple the dual cap electronic housing module and the sensor module to one another. Field wiring can be inserted into one of the ports and connected to the terminal block mounted on the printed wiring board in the field-wiring compartment. The terminal blocks can be accessed when the field-wiring cap is removed. Two external on-board pushbuttons permit zero and span adjustments, as well as local configuration, without opening the housing. The apparatus can also include an identical housing for both wired and wireless communications and can further eliminate the cost of the blind end cap and display on the base unit. The terminal block in association with the intrinsically safe circuit and noise rejection unit simplifies board replacement and reduces costly downtime and misconnections.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

As required, detailed embodiments are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ one or more embodiments.

Figure 1:
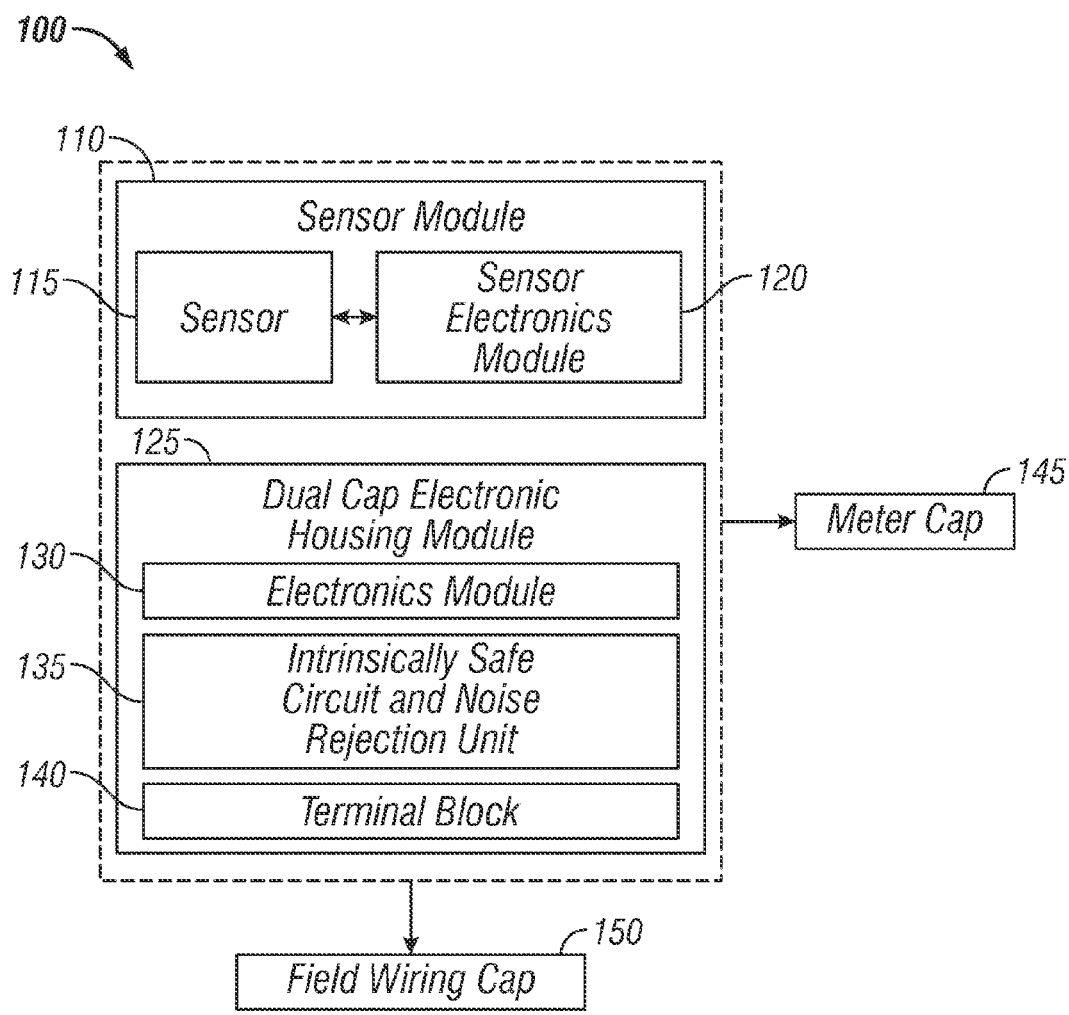
FIG. 1 illustrates a block diagram of an intrinsically safe serviceable transmitter apparatus, in accordance with the disclosed embodiments.

FIG. 1 illustrates a block diagram of an intrinsically safe serviceable transmitter apparatus 100, in accordance with the disclosed embodiments. The intrinsically safe serviceable transmitter apparatus 100 can be configured to include a sensor module 110 and a dual cap electronic housing module 125. The sensor module 110 generally includes a sensor 115 and a sensor electronic module 120, and the dual cap electronic housing module 125 includes an electronics module 130, a terminal block 140, and an intrinsically safe circuit and a noise rejection unit 135. The electrical signals from the sensor module 110 can be transmitted to the electronics module 130 in the dual cap electronic housing module 125.

The dual cap electronic housing module 125 further includes a meter cap 145 and a field wiring cap 150 in order to permit a user to open either side of the transmitter apparatus 100 in the intrinsically safe environment. Once open, a local integral meter (not shown) can be added to calibrate the apparatus 100 and/or even replace the electronics module 120. The transmitter apparatus 100 can be designed to possess the terminal block 140 in the field-wiring compartment that also acts as an intrinsically safe barrier for the rest of the transmitter electronics. Note that the embodiments discussed herein generally relate to a pressure transmitter apparatus. It can be appreciated, however, that such embodiments can be implemented in the context of other systems and designs and are not limited to the pressure transmitter. The discussion of pressure transmitter, as utilized herein, is presented for general illustrative purposes only.

Figure 2:
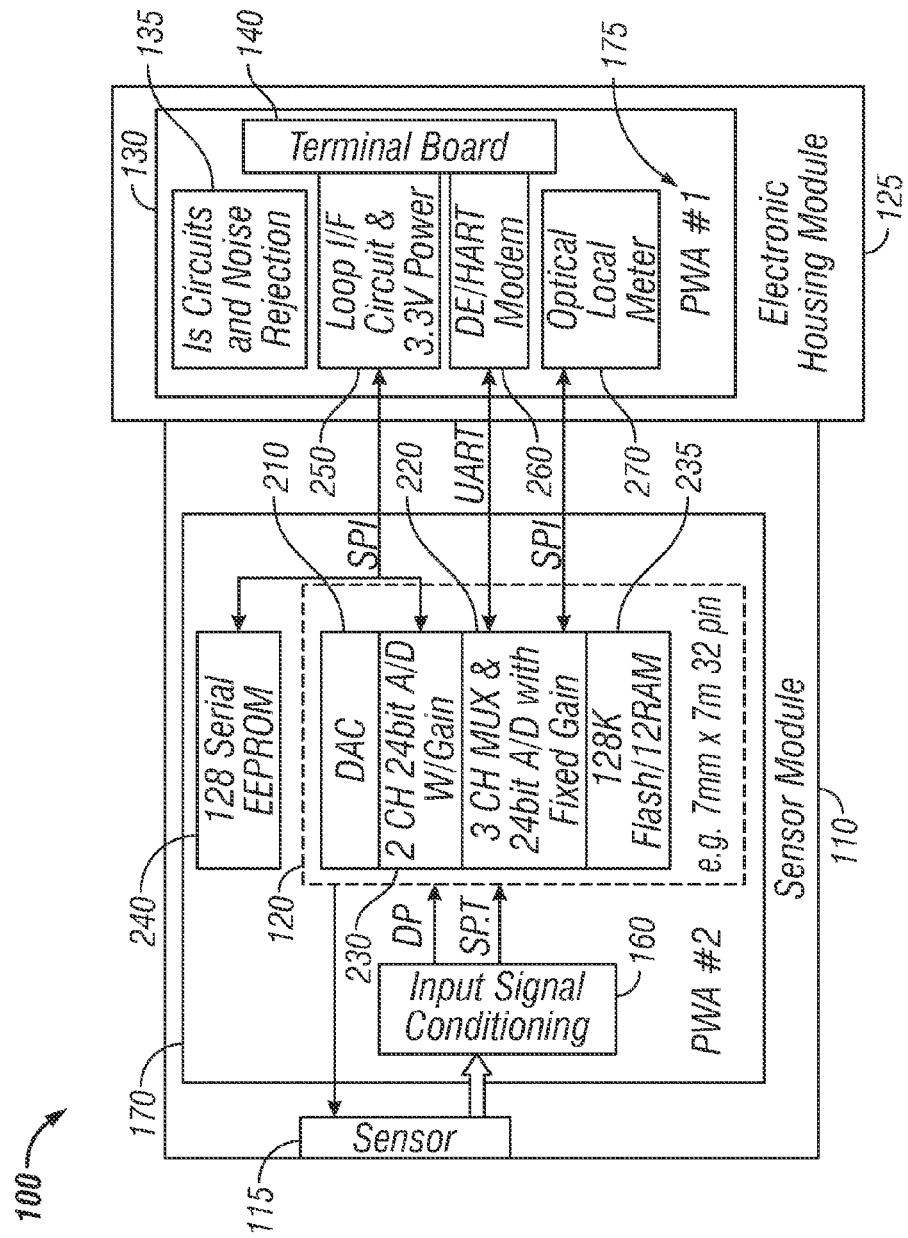
FIG. 2 illustrates a schematic diagram of an intrinsically safe serviceable transmitter apparatus, in accordance with the disclosed embodiments.

FIG. 2 illustrates a schematic diagram of the intrinsically safe serviceable transmitter apparatus 100, in accordance with the disclosed embodiments. Note that in FIGS. 1-5, identical or similar blocks are generally indicated by identical reference numerals. The transmitter apparatus 100 includes one or more printed wiring assembly (PWA) 170 and 175. The measured values and the sensor parameters from the sensor module 110 can be transferred to the dual cap electronic housing module 125 in order to compute precise primary output linearization, compensating for the combined effects of sensor non linearity, of static pressure, and temperature changes. The sensor module 110 includes a DAC unit 210, an input signal conditioner 160, an analog to digital converter 230, a multiplexer 220 (e.g., three channel multiplexer), a processor, a flash memory 235, and an EEPROM (Electrically Erasable Programmable Read-Only Memory) 240 in order to generate measurement signals that are representative of the process variable to be sensed.

The DAC 210 can be utilized in most common application of sensors to stimulate sensors or process solutions for measurement of an alternating current (AC) or direct current (DC) input or output. The analog-to-digital converter 230 converts a sensed pressure signal to a discrete time digital representation. The channel multiplexer 220 can be a device that selects one of several analog or digital input signals and forwards the selected input into a single line. The multiplexer of 2n inputs has n select lines, which can be utilized to select the input line to transmit to the output. The terminal block 140 represents a small block holding a number of conducting terminals at one side of the dual cap electronics housing module 125 for the bonding of an electric connector or other circuit means. The dual cap electronic housing module 125 includes a power source 250, DE/HART modem 260, and an optional local meter 270. The local integral optional meter 270 can display process measurements, history, diagnostics, and can display messages from a connected host or distributed control system.

Figure 3:
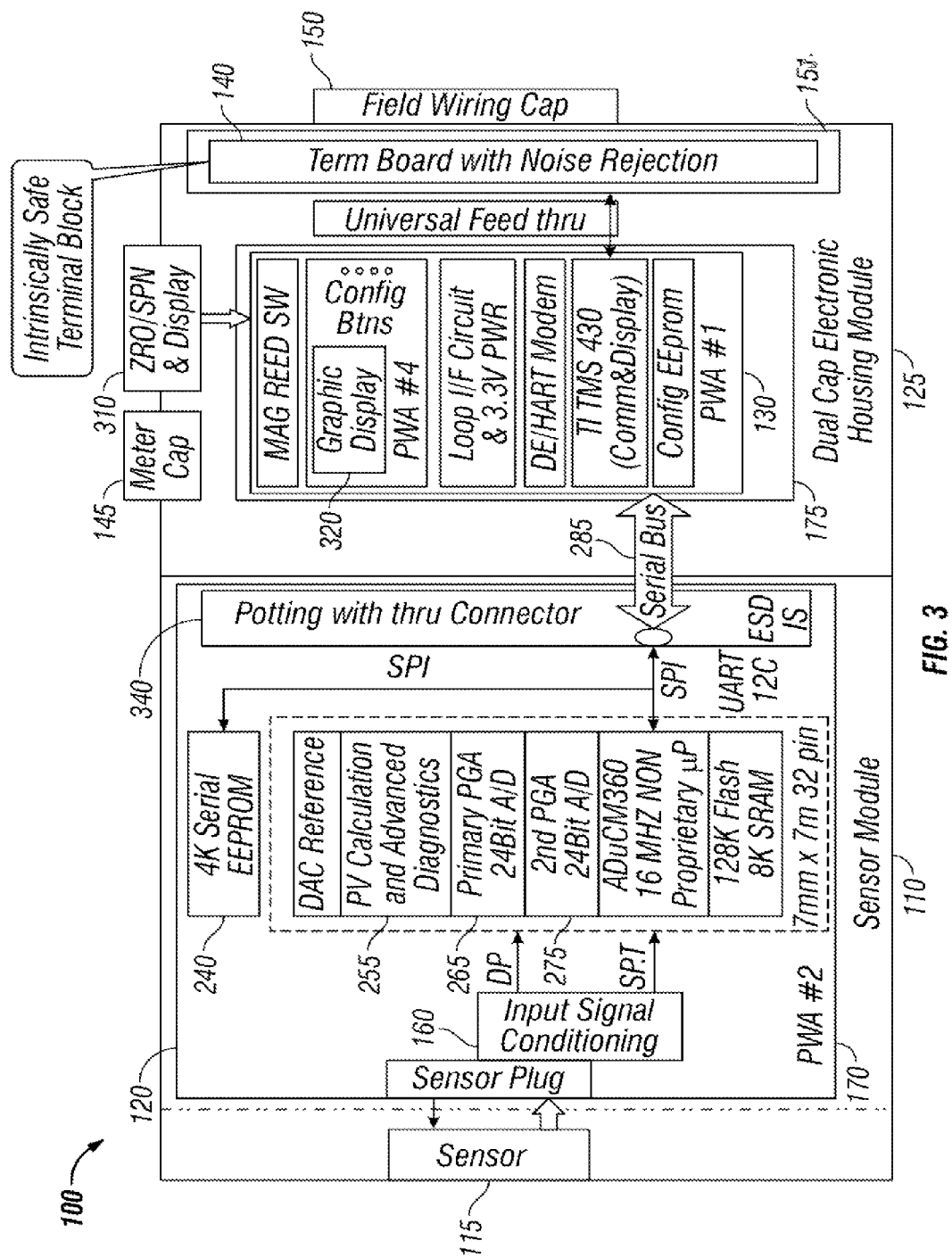
FIG. 3 illustrates a detailed schematic diagram of an intrinsically safe serviceable transmitter apparatus, in accordance with the disclosed embodiments.

FIG. 3 illustrates a detailed schematic diagram of the intrinsically safe serviceable transmitter apparatus 100, in accordance with the disclosed embodiments. As shown in FIG. 3, the sensor 115 communicates bidirectionally with the sensor module 120 (e.g., a pressure sensor board). The sensor electronic module 120 can include a process variable calculation and advanced diagnostics unit 255, a primary PGA and ADC 265, and a secondary PGA and ADC 275 in order to generate measurement signals that are representative of the process variable to be sensed. The programmable gain amplifier (PGA) is required to match sensor output range to a particular ADC's input range. In general, the programmable gain amplifier is an electronic amplifier (typically an operational amplifier) whose gain can be controlled by external digital or analog signals. The measurement signals from the sensor module 110 can be transferred to the dual cap electronic housing module 125 via a serial bus 285.

The dual cap electronic housing module 125 includes a graphic display with external configuration buttons (not shown) to display the measurement with a choice of units. The two modules 110 and 125 can be electrically connected via a connector 340. Two on-board pushbuttons 310 permit zero and span adjustments, as well as local configuration. The apparatus 100 includes an identical housing for wired and wireless communication and eliminates cost of the blind end cap and display on the base unit. Field wiring can be inserted into one of the ports and connected to the terminal block 140 mounted on the printed wiring board 175 in the field-wiring compartment. In the particular configuration shown in FIG. 3, the terminal block 140 is accessible when the field-wiring cap 150 is removed.

Figure 4:
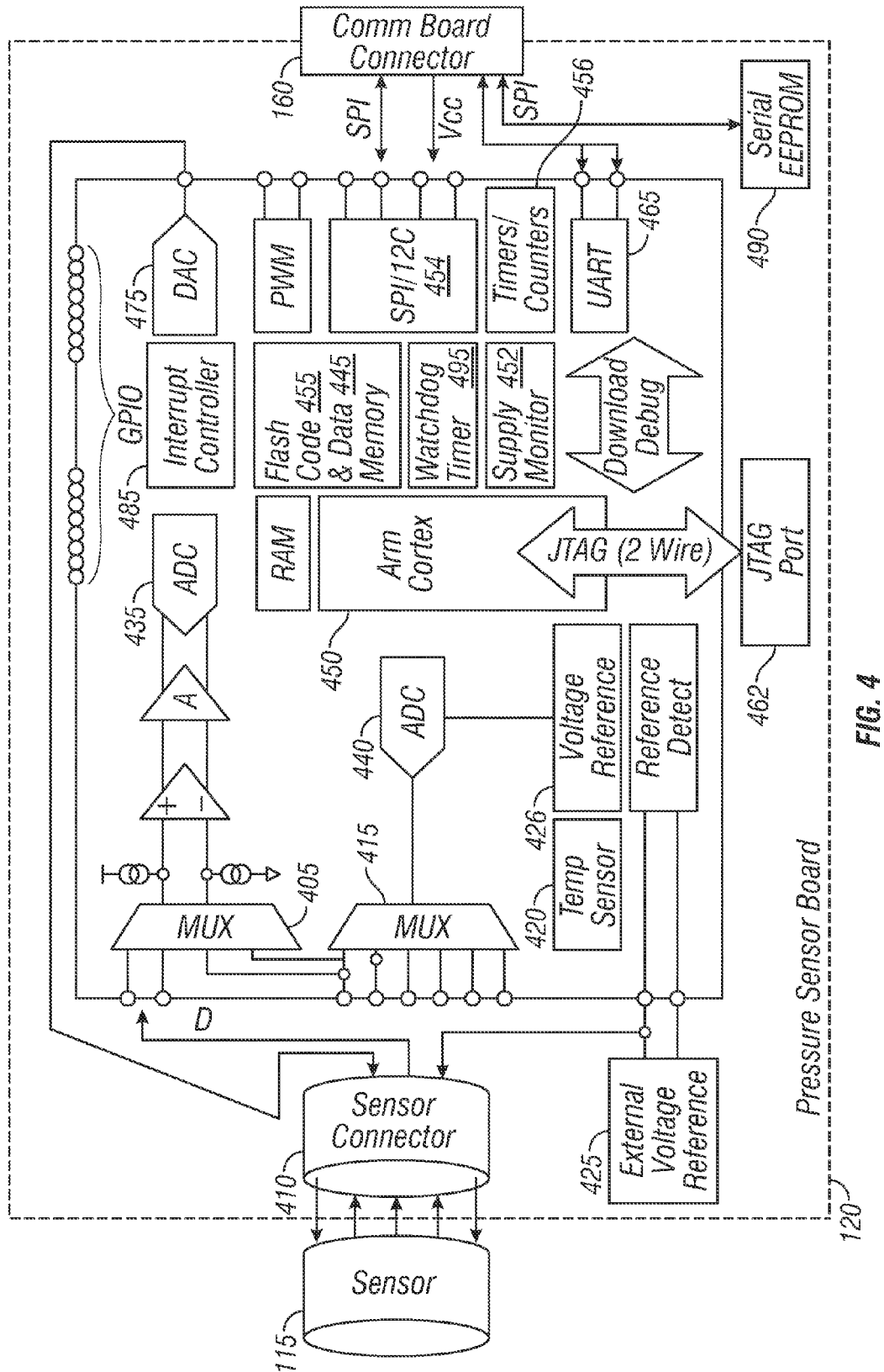
FIG. 4 illustrates a circuit diagram of a pressure board associated with an intrinsically safe serviceable transmitter apparatus, in accordance with the disclosed embodiments.

FIG. 4 illustrates a circuit diagram of a pressure board 120, in accordance with the disclosed embodiments. The pressure board 120 (e.g., a sensor module) includes components and electronics for transmitting electrical pressure signals generated by the pressure sensor 115 to the dual cap electronic housing module 125. The output from the sensor 115 can be transmitted to the pressure board 120 via a sensor connector 410 in order to condition the output of the sensor 115 into a format compatible with the communication electronics module 130. The pressure board 120 can include/connect a temperature sensor 115, one or more multiplexers 405 and 415, a voltage reference circuit 425 and 426, one or more analog-to-digital converters 435 and 440, a processor 450, a watchdog timer 495, and an interrupt controller 485 for conditioning the sensor signal and performing other functions. The output from the sensor 115 can be transmitted to the multiplexers 405 and 415 that select one of several analog input signals and forward the selected input into the analog-to-digital converters 440 and 435. The output from the temperature sensor 420 can be a select line for the multiplexer 415, which can be employed to select which input line to send to the analog-to-digital converter 440.

The temperature sensor 420 can be positioned in such a manner so as to determine the ambient temperature around the pressure board 120. The built-in temperature sensor 420 includes the reference voltage circuit 425, which produces a fixed (constant) voltage irrespective of the loading. The processor 450 can be, for example, an ARM Cortex™-M3 processor, which is an industry-leading micro-power 32-bit processor for highly deterministic real-time applications and has been specifically developed to enable partners to develop high-performance low-cost platform for a broad range of devices. A debug connector 462, for example, STAG permits hardware to transfer data to FLASH 455. The debug connector 462 can be employed for programming as well as debugging.

The pressure board 120 can further include a serial EPROM data memory 490, a watchdog timer 495, and a supply monitor 452. The supply monitor 452 monitors the power supply and in case the voltage exceeds a fixed dangerous value a reset command to the processor 450 is generated. The watchdog timer 495 can be implemented to interact with the processor 450 and in case of error the watchdog timer 495 resets the processor 450. The ADC converter 435 and 440 are stored in RAM 445 and used by the processor 450 to process all the necessary calculations and consistency checks and to calculate the compensated output with correct scaling. The RAM 445 can be employed by the processor 450 to store and read configuration data. The digital to analog converter 475 transfers sensor power to sensor connector 410 and can also be utilized to stimulate sensor 115.

The serial peripheral interface bus 454 (or I2C interface) can be implemented as a synchronous serial data link standard for communicating with devices in a master/slave mode, where the master device initiates the data frame. Both the pressure sensor 115 and built-in temperature sensor 420 and other signals can be read via the SPI 454 and transferred to the communications board connector 160. A universal asynchronous receiver/transmitter 465, abbreviated UART, is a type of "asynchronous receiver/transmitter", a piece of hardware that translates data between parallel and serial forms. Note that the UART can also be utilized in some embodiments to convey measured signals to the communications board connector 160.

Figure 5:
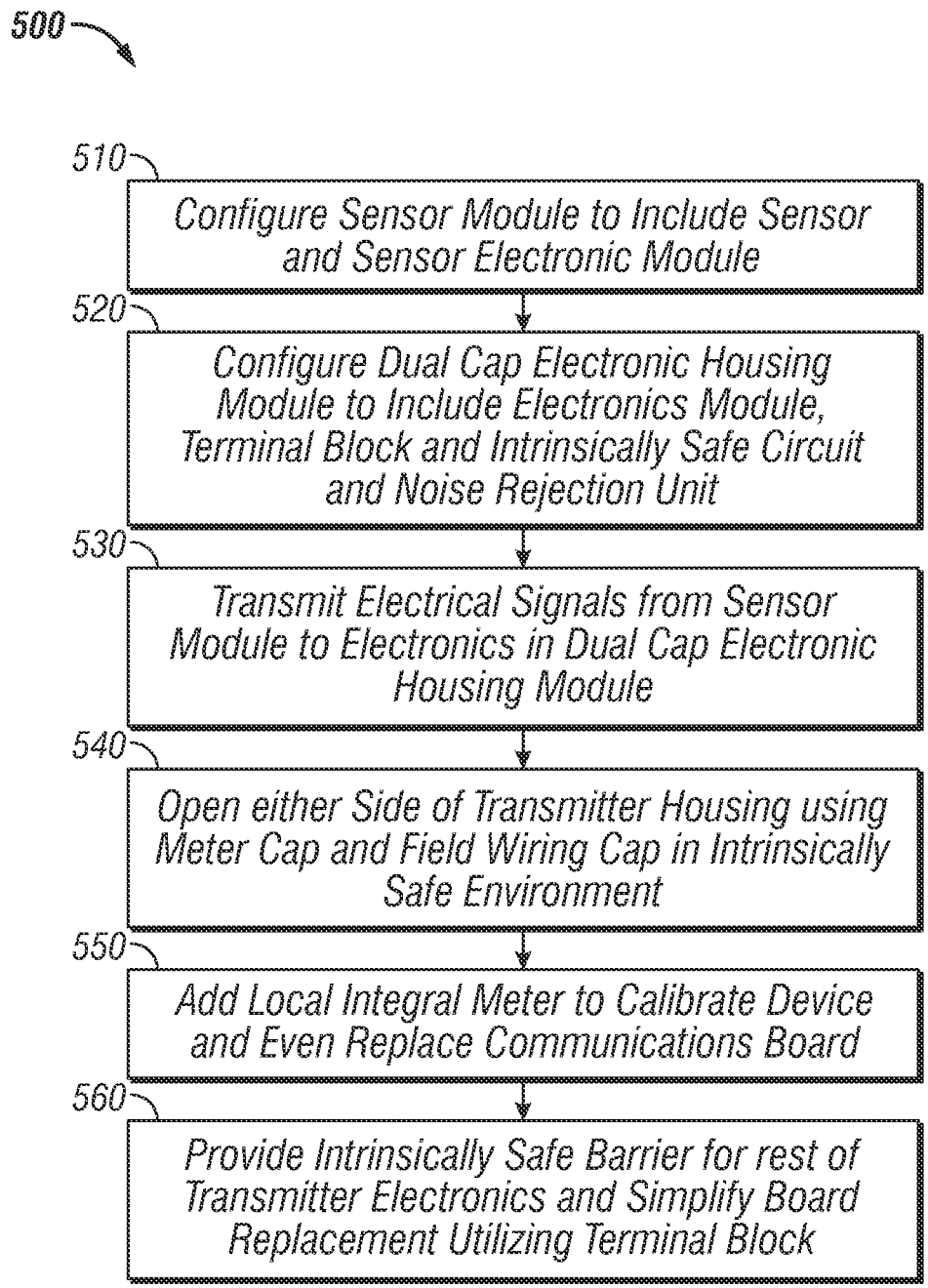
FIG. 5 illustrates a high level flow chart of operations illustrating logical operational steps of a method for configuring an intrinsically safe serviceable transmitter, in accordance with the disclosed embodiments.

FIG. 5 illustrates a high level flow chart of operations illustrating logical operational steps of a method 500 for providing the intrinsically safe serviceable transmitter apparatus, in accordance with the disclosed embodiments. As indicated at block 510, the sensor module 110 can be configured to include the sensor 115 and the sensor electronic module 120. Next, as illustrated at block 520, the dual cap electronic housing module 125 can be configured to include the electronics module 130, the terminal block 140, and the intrinsically safe circuit and noise rejection unit 135.

The electrical signals from the sensor module 110 can be transmitted to the electronics module 130 in the dual cap electronic housing module 125, as indicated at block 530. Thereafter, as shown at block 540, either side of the transmitter housing can be opened utilizing the meter cap 145 and the field-wiring cap 150 in the intrinsically safe environment. Once open, the local integral meter 270 can be added to calibrate the apparatus 100 and/or even replace a communications board, as indicated at block 550. The terminal block 140 located in a field-wiring compartment acts as an intrinsically safe barrier for the rest of the transmitter electronics and simplifies board replacement for fast, convenient board or device replacement, as depicted at block 560.

Based on the foregoing, it can be appreciated that a number of embodiments, both preferred and alternative, are disclosed. For example, in one embodiment, an intrinsically safe transmitter apparatus is disclosed, which includes a housing for maintaining transmitter electronics and a terminal board that communicates with the transmitter electronics, the terminal board maintained by the housing. Such an embodiment, also includes a field wiring compartment 151 that acts as an intrinsically safe barrier with respect to the transmitter electronics and maintains the terminal board within the field wiring compartment, thereby allowing for access to the housing for servicing of the transmitter electronics and other components thereof in an intrinsically safe environment. In another embodiment, the housing can comprise an electronic housing module. In still another embodiment, such a housing may constitute a dual cap electronic housing module.

In yet another embodiment, a transmitter apparatus is disclosed, which generally includes a sensor module having a sensor and a sensor electronic module, and an electronic housing module having an electronic module. Such an embodiment may further include a terminal block, an intrinsically safe circuit and a noise rejection unit, such that the electronic housing module receives an electrical signal from the sensor module. Such a transmitter apparatus can also include a meter cap and a field wiring cap located on the electronic housing module, which permits a user to open either side of the electronic housing module in an intrinsically safe environment, and a local integral meter connected to the electronic housing module in order to calibrate or configure the transmitter apparatus and replace a communications board wherein the terminal block located in a field-wiring compartment acts as an intrinsically safe barrier for the transmitter electronic module and simplifies the board replacement.

In another embodiment of such a transmitter apparatus, the electronic housing module can include a dual cap electronic housing module. In yet another embodiment, one or more printed wiring assemblies can be provided to transfer a sensor parameter to the electronic housing module and to compute a precise primary output linearization. In other embodiments, the aforementioned sensor module can include a digital-to-analog converter supplied bridge power unit, an input signal conditioner, an analog to digital converter, a three channel multiplexer, and an electrically erasable programmable read-only memory that together assist in generating signals representative of a process variable to be sensed/detected.

In still another embodiment, the sensor module can include a power source, a modem, and an optional local meter. The optional local meter can be activated if the sensor module detects problems in transmitting the signal. In yet another embodiment, a graphic display can be provided with one or more configuration button that displays the measurement signal with a choice of units. Additionally, a connector for mechanically coupling the dual cap electronic housing module and the sensor module can be employed. In yet another embodiment, a field wiring can be inserted into one or more ports connected to the terminal block mounted on the printed wiring board wherein the terminal block is accessed when the field-wiring cap is removed. In still another embodiment, two or more on-board pushbuttons can be employed, which permit a zero and span adjustment and a local configuration. In another embodiment, a step can be implemented for providing an identical housing for wired communications and wireless communications.

In another embodiment, a method can be implemented for configuring an intrinsically safe transmitter apparatus. Such a method can include the steps of providing a sensor module having a sensor and a sensor electronic module, and configuring an electronic housing module to include an electronic module, a terminal block, and an intrinsically safe circuit and a noise rejection unit, wherein the electronic housing module receives an electrical signal from the sensor module. Such a method can also include the steps of locating a meter cap and a field wiring cap on the electronic housing module, which permits a user to open either side of the electronic housing module in an intrinsically safe environment, and connecting a local integral meter to the electronic housing module in order to calibrate or configure the transmitter apparatus and replace a communications board wherein the terminal block located in a field-wiring compartment acts as an intrinsically safe barrier for the transmitter electronic module and simplifies the board replacement.

In another embodiment, a step can be provided for configuring the electronic housing module to comprise a dual cap electronic housing module. In still another embodiment, a step can be provided for providing at least one printed wiring assembly to transfer a sensor parameter to the electronic housing module and to compute a precise primary output linearization. In yet other embodiments, a step can be implemented for configuring the sensor module further to comprise: a digital-to-analog converter supplied bridge power unit, an input signal conditioner, an analog to digital converter, a three channel multiplexer, and an electrically erasable programmable read-only memory in order to generate the signal that are representative of a process variable to be sensed.

In other embodiments, a step can be provided for configuring the sensor module to comprise: a power source, a modem, and an optional local meter wherein the optional local meter is activated if the sensor module detects problem in transmitting the signal. In still other embodiments, steps can be implemented for configuring a graphic display with a plurality of configuration buttons that displays the measurement signal with a choice of units, and mechanically coupling the dual cap electronic housing module to the sensor module utilizing a connector. In another embodiment, a step can be provided for inserting a field wiring inserted at least one port connected to the terminal block mounted on the printed wiring board wherein the terminal block is accessible when the field-wiring cap is removed. Additionally, a step can be implemented for providing an identical housing for wired communications and wireless communications.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An intrinsically safe transmitter apparatus, comprising:
   a sensor module having a sensor and a sensor electronic module wherein said electronic sensor module comprises a process variable and advanced diagnostics unit, a primary programmable gain amplifier and analog to digital converter, and a secondary programmable gain amplifier and analog to digital converter;
   an electronic housing module having an electronic module, a terminal block and an intrinsically safe circuit and a noise rejection unit, wherein said electronic housing module receives an electrical signal from said sensor module;
   a meter cap and a field wiring cap located on said electronic housing module, which permits a user to open either side of said electronic housing module in an intrinsically safe environment; and
   a local integral meter connected to said electronic housing module in order to calibrate or configure said transmitter apparatus wherein said terminal block located in a field-wiring compartment acts as an intrinsically safe barrier for said transmitter apparatus and simplify said board replacement.

2. The apparatus of claim 1 wherein said electronic housing module comprises a dual cap electronic housing module.

3. The apparatus of claim 1 further comprising at least one printed wiring assembly to transfer a sensor parameter to said electronic housing module and to compute a precise primary output linearization.

4. The apparatus of claim 1 wherein said sensor module further comprises:
   a digital-to-analog converter supplied bridge power unit, an input signal conditioner, an analog to digital converter, a three channel multiplexer and an electrically erasable programmable read-only memory in order to generate said signal that are representative of a process variable to be sensed.

5. The apparatus of claim 1 wherein said sensor module further comprises:
   a power source, a modem and an optional local meter wherein said optional local meter is activated if said sensor module detects problem in transmitting said signal.

6. The apparatus of claim 1 further comprising:
   a connector for mechanically coupling said dual cap electronic housing module and said sensor module.

7. The apparatus of claim 1 further comprising a field wiring inserted into at least one port connected to said terminal block mounted on a printed wiring board wherein said terminal block is accessed when said field wiring cap is removed.

8. The apparatus of claim 1 further comprising at least two on-board pushbuttons that permits a zero and span adjustment and a local configuration.

9. The apparatus of claim 1 wherein said electronic housing module is identical for wired communications and wireless communications.

10. An intrinsically safe method for configuring an intrinsically safe transmitter apparatus, said method comprising:
    providing a sensor module having a sensor and a sensor electronic module wherein said electronic sensor module comprises a process variable and advanced diagnostics unit, a primary programmable gain amplifier and analog to digital converter, and a secondary programmable gain amplifier and analog to digital converter
    configuring an electronic housing module to include an electronic module, a terminal block and an intrinsically safe circuit and a noise rejection unit, wherein said electronic housing module receives an electrical signal from said sensor module;
    locating a meter cap and a field wiring cap on said electronic housing module, which permits a user to open either side of said electronic housing module in an intrinsically safe environment; and
    connecting a local integral meter to said electronic housing module in order to calibrate or configure said transmitter apparatus wherein said terminal block located in a field-wiring compartment acts as an intrinsically safe barrier for said transmitter apparatus and simplify said board replacement.

11. The method of claim 10 further comprising configuring said electronic housing module to comprise a dual cap electronic housing module.

12. The method of claim 10 further comprising providing at least one printed wiring assembly to transfer a sensor parameter to said electronic housing module and to compute a precise primary output linearization.

13. The method of claim 10 further comprising configuring said sensor module further to comprise:

a digital-to-analog converter supplied bridge power unit, an input signal conditioner, an analog to digital converter, a three channel multiplexer and an electrically erasable programmable read-only memory in order to generate said signal that are representative of a process variable to be sensed.

14. The method of claim 10 further comprising configuring said sensor module to comprise:
a power source, a modem and an optional local meter wherein said optional local meter is activated if said sensor module detects problem in transmitting said signal.

15. The method of claim 10 further comprising:
mechanically coupling said dual cap electronic housing module to said sensor module utilizing a connector.

16. The method of claim 10 further comprising inserting a field wiring inserted at least one port connected to said terminal block mounted on a printed wiring board wherein said terminal block is accessible when said field wiring cap is removed.

17. The method of claim 10 wherein said electronic housing module is identical for wired communications and wireless communications.

* * * * *